(12) United States Patent
Velicki

(10) Patent No.: US 6,431,837 B1
(45) Date of Patent: Aug. 13, 2002

(54) STITCHED COMPOSITE FAN BLADE

(76) Inventor: Alexander Velicki, 12771 Amethyst St., Garden Grove, CA (US) 92845-2805

(*) Notice: Subject to any disclaimer, the term of this patent is extended or adjusted under 35 U.S.C. 154(b) by 0 days.

(21) Appl. No.: 09/571,227

(22) Filed: May 16, 2000

Related U.S. Application Data (60) Provisional application No. 60/136,825, filed on Jun. 1, 1999.

(51) Int. Cl.$^7$ ................................................. F04D 29/38
(52) U.S. Cl. .................................. 416/223 R; 416/230
(58) Field of Search ............................ 416/229 R, 230

(56) References Cited

U.S. PATENT DOCUMENTS

| | | |
|---|---|---|
| 3,903,578 A | 9/1975 | Rothrman |
| 4,410,577 A | 10/1983 | Palmer |
| 5,063,662 A | 11/1991 | Porter |
| 5,129,787 A | 7/1992 | Violette |
| 5,213,476 A | 5/1993 | Monroe |
| 5,240,377 A | 8/1993 | Farr |
| 5,340,280 A | 8/1994 | Schilling |
| 5,490,602 A | 2/1996 | Wilson |
| 6,187,411 B1 * | 2/2001 | Palmer .................. 416/229 R |

* cited by examiner

Primary Examiner—John Kwon (57) ABSTRACT

A hollow core fan blade for a gas turbine engine, having stitched composite skins and substructure, is fabricated using a resin transfer molding approach which results in a damage tolerant and cost-efficient structure. The fan blade is comprised of a stitched composite cover that is in-turn stitched to a spar and rib-like substructure made of similar carbon fiber materials. A titanium leading edge, root section, and tip closeout member are added to the stitched carbon fibers and placed inside a forming die. Resin is infused, after which the blade assembly, having predetermined design characteristics, is cured by heating the forming die and pressurizing the part internally with a set of inflatable bladders which ultimately yields a rigid fan blade component.

19 Claims, 8 Drawing Sheets

STITCHED COMPOSITE FAN BLADE

CROSS-REFERENCE TO RELATED APPLICATIONS

This patent application claims the benefits of Provisional Patent Application No. 60/136,825, filed Jun. 1, 1999.

STATEMENT REGARDING FEDERALLY SPONSORED RESEARCH OR DEVELOPMENT

This invention was not made by an agency of the United States Government or under a contract with an agency of the United States Government.

REFERENCE TO MICROFICHE APPENDIX

Not Applicable

BACKGROUND OF THE INVENTION

This invention relates to the design features of a hollow-core structure, and more particularly to the design features for a stitched carbon fiber reinforced hollow core fan blade for a turbofan engine.

In a continuous development cycle to improve turbofan engine operating efficiencies for jet aircraft, engine manufacturers have been designing increasingly higher thrust engines. This new generation of engines, known as "high bypass engines" or "very high bypass engines", typically operate at significantly higher bypass ratios than their predecessors. To achieve these higher bypass ratios, airflow into the engine must be substantially increased. Generally, this is accomplished by increasing the inlet diameter of the engine. While this effectively increases the operating performance of the engine, it also requires that the first stage engine fan blades operate in a more demanding structural environment, as they increase in length and size. As a result, blade designs that worked in past applications are no longer able to meet these more difficult design parameters. Increases in blade size and mass result in dynamic-induced load conditions that can exceed the strength capability of current high-performance materials, such as titanium alloys or carbon fiber composites. Therefore, design changes in the structural geometry or shape of the blade are necessary to meet these new design requirements. While much work has been done on changing the exterior shape of fan blades by employing a wide-chord design philosophy, very little has been done to change the interior arrangement of the blade. One of the most effective ways to improve the structural performance of a rotating component is to reduce the structural mass of the part. This results in lower rotational inertia forces which reduces the internal loads experienced along the length of the blade. For rotating equipment where the rotational velocity is held constant and material properties are generally fixed, a reduction in mass is the single most effective way of accomplishing significant improvements in structural performance.

Reductions in part mass are especially beneficial because they produce a compounding-effect. As the mass is reduced, the magnitude of the internal loads drops, which in turn leads to further reductions in structural mass. A practical limit for this iteration is reached when the part reaches a fully stressed design point for a given set of material properties and load conditions. Once this design point is reached, the structural geometry or shape of the part is optimum. Any further improvements in the overall structural performance can only be achieved by changing or improving the material properties of the as-fabricated part. Thus it is important to note, that its geometric shape and specific material properties primarily influence the structural efficiency of a given component. Once the part geometry is optimized, only improvements in the strength and stiffness properties of the material will result in improvements in the structural performance. The premise of optimizing both the structural geometry and material properties is the overall basis for the stitched-composite hollow-core fan blade design described herein. It combines the superior mechanical properties found in carbon fiber based stitched composite materials with the optimum structural geometry inherent in a hollow-core structural arrangement. Through the combination of these two important design features, the optimum structural design point for a fan blade component is achieved.

Current state-of-the-art construction techniques for fan blade fabrication are comprised of hollow-core titanium designs and solid laminate carbon fiber designs. While both methodologies employ a wide-chord design geometry to improve the structural efficiency of the blade element, their respective design philosophies diverge based on their choice of materials. In each case, the design is driven by the limitations of their respective material systems rather than by the objectives of the design problem. For instance, the hollow-core titanium design approach uses the best structural geometry to optimize the internal loading through the structure, but the specific material properties (divided by density) of the titanium alloys are inferior to those of typical high-performance carbon fiber materials. In contrast, the carbon fiber design approach makes use of the high specific material properties of the carbon fibers, but does not take advantage of the hollow-core design approach to optimize the structural loading in the blade body. The optimum design approach would be to combine the hollow-core geometry with the high specific mechanical properties of the carbon fiber materials. The resulting blade design would provide the most structurally efficient fan blade possible for a given structural volume and set of design parameters.

While a hollow core carbon fiber fan blade is highly desirable, there are several limitations that have previously precluded its development. The primary concern for such a component is the limited damage tolerance behavior of laminated carbon fiber materials. As carbon fibers are known to be more brittle than metallic materials, meeting the impact damage design requirements for the bird-strike load condition has proved difficult. In order to meet these requirements, existing carbon fiber fan blade designs make two compromises: 1) blade sections are kept solid to maximize the amount of material at a given cross-section, and 2) the rotational velocity of the fan blade assembly is lowered to decrease the impact energy of the bird-strike. Each of these compromises is made because of the limited damage tolerance capability of the carbon fiber material systems and ultimately results in degraded engine performance. The key to removing these impediments is to improve the through-the-thickness mechanical strength of carbon fiber laminates. Prior efforts to accomplish this were focused on using toughened resin systems. While this approach has proven somewhat effective, the attained improvements are still significantly lower than the mechanical strengths realized in the primary fiber directions of the laminate. Since fiber properties are superior to than those of the resin, placing fibers in the z-direction (perpendicular to the lay-up plane) of the laminate offers the highest potential for improving the through-the-thickness mechanical properties of the carbon fiber material system. Indeed, the use of fiber reinforcement in the z-direction is the enabling advancement of the art that permits a hollow-core design approach to be successfully implemented using carbon fiber materials.

Another concern is the difficulty of fabricating a hollow core structure that is both damage tolerant and cost-effective using carbon fiber material systems. While several hollow core design approaches have been proposed in prior art, none of them is capable of satisfying the damage tolerance requirements necessary to meet the bird-strike load case because they rely solely on the resin interface to provide the through-the-thickness mechanical strength for the part. Since resin properties are not capable of providing an adequate level of damage resistance, further development of those particular fan blade design approaches has not resulted. Without significantly advancing the state-of-the-art in damage arrestment and residual strength, further development of carbon fiber hollow core fan blade concepts is unlikely.

To advance the state-of-the-art regarding damage tolerance, the stitched composite fan blade design described herein employs three key design features: 1) it uses through-the-thickness stitching to improve the z-direction mechanical strength, 2) it has a multi-element substructure design to provide structural redundancy, and 3) it has a continuous cover skin load path around the root section at each spar location. All of these advancements in the art were pursued to achieve the requisite level of damage tolerance necessary to make a composite hollow core fan blade operationally feasible. The out-of-plane mechanical properties are enhanced by the stitching and are no longer dictated by the inferior resin properties at the interface. The multi-element substructure arrangement not only reduces blade mass and internal loads it provides structural redundancy, whereby a single spar element failure does not preclude failure of the entire blade body. The continuous cover skin load path around the root section at each spar location maintains the load continuity in the highly loaded covers and reduces the structural fragility normally encountered at the root joint. All of these design features are extremely advantageous for the bird-strike load case because they work together to improve the damage characteristics of the materials as well as the overall load distribution within the structure. This will result in higher residual strengths and more resilient failure modes, as the redundant substructure elements redistribute internal loads to prevent the blade body from breaking-away during an impact. The synergy provided by these design features advance the art to the point where a hollow-core blade geometry made using carbon fiber composites is now feasible.

It is known that in prior art to design and manufacture hollow core titanium fan blades for large gas turbine engines by machining matching cavities in titanium plates, then diffusion bonding the halves together inside a die cavity. It is also known that laminating pre-plied carbon fibers together can produce a solid carbon fiber fan blade design. It is also know that hollow-core blade designs of pre-plied materials have also been proposed. However, the titanium-based designs and manufacturing methods do not utilize the high specific properties of composite materials, while the composite material-based approaches do not meet the rigorous damage tolerant requirements for the bird-strike load case. In either case, the resulting blades tend to be heavier than a fully optimized design would be. What is needed, therefore, is a reinforced composite hollow core fan blade design that can be cost-effectively manufactured and which also meets the more stringent damage tolerance requirements imposed by the design conditions of the high bypass ratio engine.

BRIEF SUMMARY OF THE INVENTION

This invention solves the problem outlined above by combining the efficient load-carrying arrangement of a hollow-core multi-element substructure with the superior mechanical properties of stitched carbon fiber materials to produce a fan blade that is both highly damage tolerant and relatively inexpensive to manufacture. The blade is comprised of a multi-element substructure consisting of vertical spars and horizontal ribs that are enclosed within a cover skin, all of which is stitched together to form a dry preform assembly. Three titanium detail parts are added to the preform assembly to closeout the edges. The entire part assembly is infused with resin and cured to produce a rigid part. There are three important features that enable this design to be extremely durable and damage tolerant: 1the carbon fiber stacks that comprise the cover skin and substructure are stitched together to enhance the through-the-thickness mechanical properties, 2the substructure is a multi-element design to provide structural redundancy, and 3the cover skins are continuous at each spar location to provide improved load transfer around the root fitting joint.

Another important advantage of the invention is the hollow-core substructure design. It not only enhances the loading aspects of the part, it also permits the part to be manufactured using an internal pressure apparatus with a removable bladder system. The advantages of this are, smooth and uniform inner surfaces, as well as a significant reduction in part cost because it makes out-of-autoclave processing possible. The detail design nature of the substructure passage network is also a very important design features because it ultimately enables the fabrication of this invention.

DETAILED DESCRIPTION OF THE INVENTION

The present invention provides a design for a stitched carbon fiber fan blade component for a high bypass turbofan engine that is both damage tolerant and cost-effective to manufacture. It relies on a hollow-core geometry to efficiently distribute internal loads, through-the-thickness stitching to provide superior out-of-plane mechanical strength, and a continuous cover skin at each spar location to maintain the load path around the root fitting.

Figure 1:
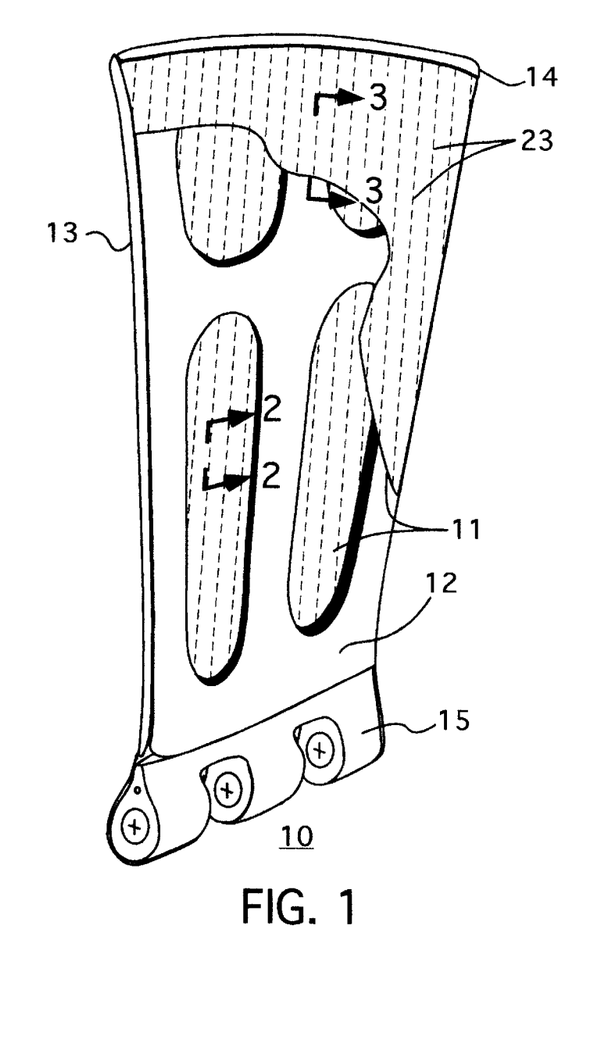
FIG. 1 is a perspective view showing the overall blade assembly with the lower portion of the suction side cover removed.
Figure 2:
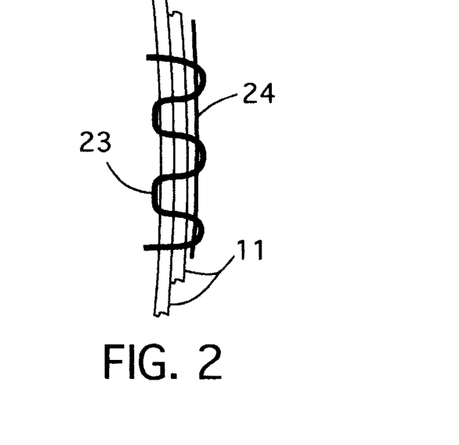
FIG. 2 is a cross-sectional view along lines 2—2 of FIG. 1, showing stitching through the pressure side cover.
Figure 3:
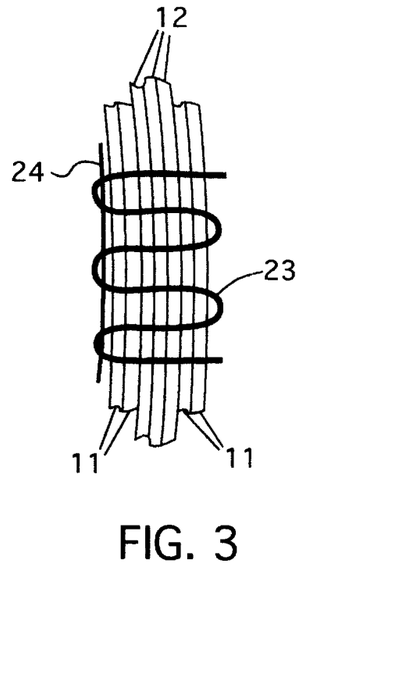
FIG. 3 is a cross-sectional view along lines 3—3 of FIG. 1, showing stitching through the cover and substructure layers.

A perspective view of the overall blade assembly 10 is shown in FIG. 1 with the lower portion of the suction side cover removed to expose the hollow areas of the substructure 12. The blade assembly 10 is comprised of a carbon fiber cover 11, a carbon fiber substructure 12, a titanium leading edge detail 13, a titanium tip closeout detail 14, and a titanium root fitting 15 at the base. The carbon fiber stack materials are reinforced with through-the-thickness penetration thread 23 everywhere except along the root fitting 15. Each side of the cover 11 is individually stitched together in the regions encompassed by the hollow areas. FIG. 2 shows how the individual skin layers are stitched with a vertical penetration thread 23 of either carbon or aramid fibers and then restrained from pulling through the backside with a locking thread 24 of similar material. Although the figure only shows two discrete layers of material, the cover 11 could be comprised of many layers stitched together or just one layer which would not be stitched; or any combination of layers thereof within a single part. In regions where the cover 11 and substructure 12 overlap to create a solid thickness, through-the-thickness stitching with a penetration thread 23 and locking thread 24 would be used to reinforce the attachment of the cover 11 to the substructure 12 as shown in FIG. 3.

Figure 4:
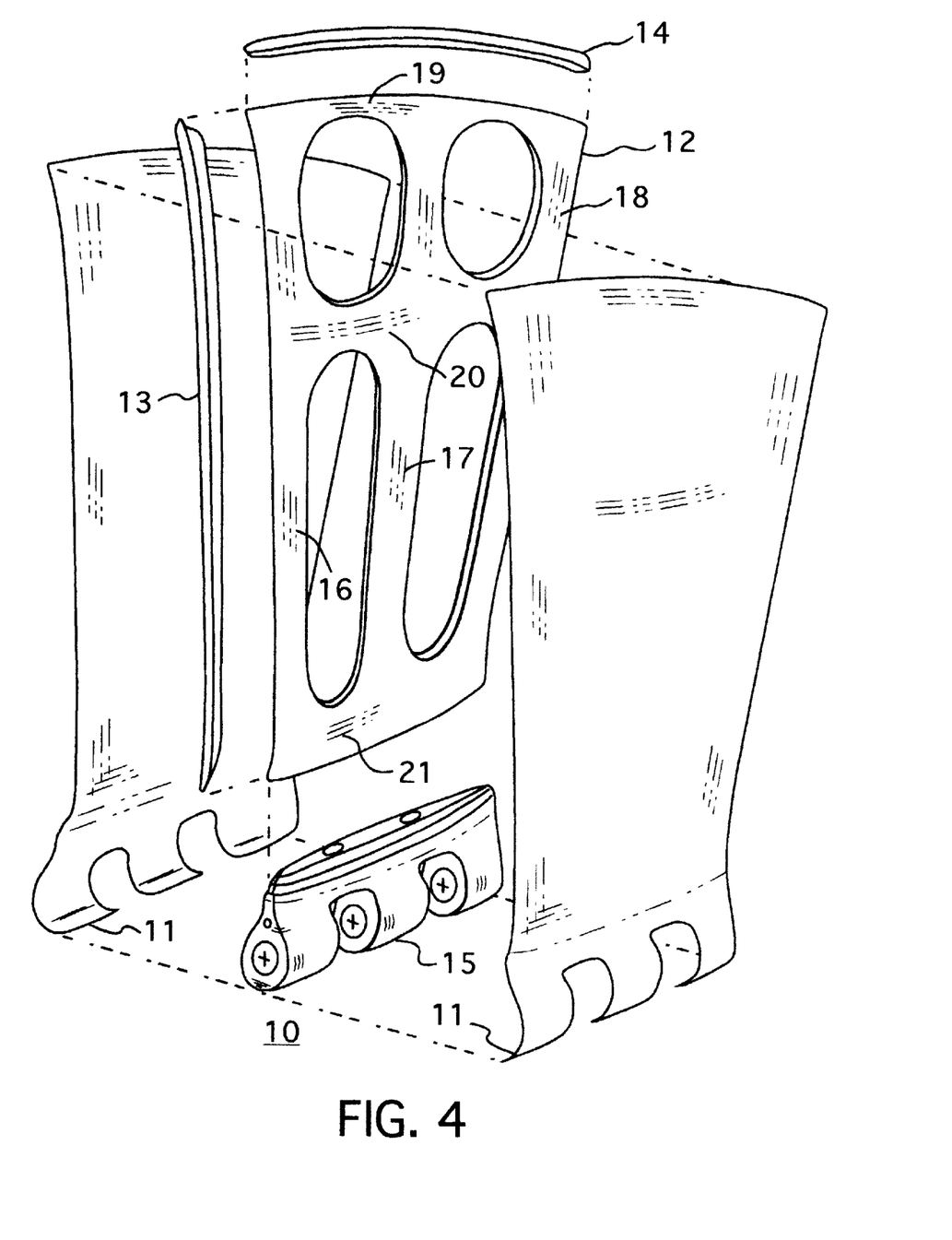
FIG. 4 is an exploded perspective view showing the individual details and regions that comprise the blade assembly.

Once the carbon fiber cover 11 and substructure 12 is stitched together to form a dry fiber preform, the three titanium details are inserted into the preform in the relative positions shown in FIG. 4 to create the blade assembly 10. In this figure, the cover 11 is shown in a position split about the root fitting 15 mid-plane as well as not stitched to the substructure 12. This was done to better show the alignment of the internal parts. In reality once stitched, the cover 11 forms a U-shaped geometry that encloses all of the other detail parts. The titanium leading edge detail 13 butts up against the edge of the substructure 12 and is partially overlapped on both sides by the cover 11. In a similar manner, the tip closeout detail 14 is inserted at the top of the preform assembly. At the base, the root fitting 15 is slipped into the gap between the substructure 12 runout and the loop of the cover 11 as it transitions from the suction to pressure side of the blade. The combination of these parts creates a structural configuration with a multi-spar and rib arrangement for structural redundancy. The substructure is comprised of multiple regions identified as a forward spar 16, mid spar 17, aft spar 18, tip rib 19, mid rib 20, and a root rib 21.

Figure 5:
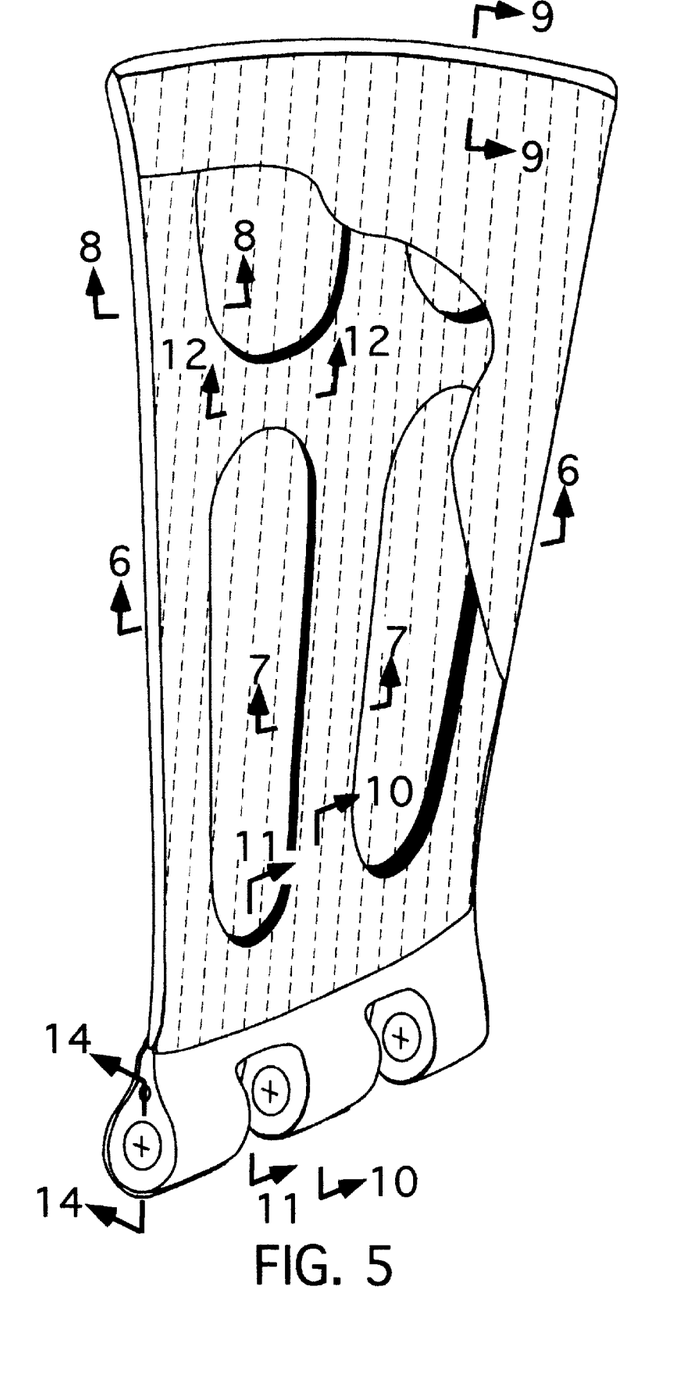
FIG. 5 is a perspective view of the overall blade assembly showing the location and orientation of the cross-sectional views.

Once the titanium parts are loosely inserted into the fiber preform, the entire assembly is placed inside a die and infused with resin. As the part is heated and infused, a set of internal bladders is expanded to push out excess resin and provide the uniform internal pressure needed to cure the part. After adequate temperature and pressure are applied, a cured part of the configuration shown in FIG. 5 is achieved. In this figure, the lower portion of the suction side cover 11 is cut away to show the internal features of the substructure. The detail feature cross-sectional drawings for the assembly, which are referenced in FIG. 5, are shown in FIGS. 6 through 11 and 14, and described in the following text.

Figure 6:
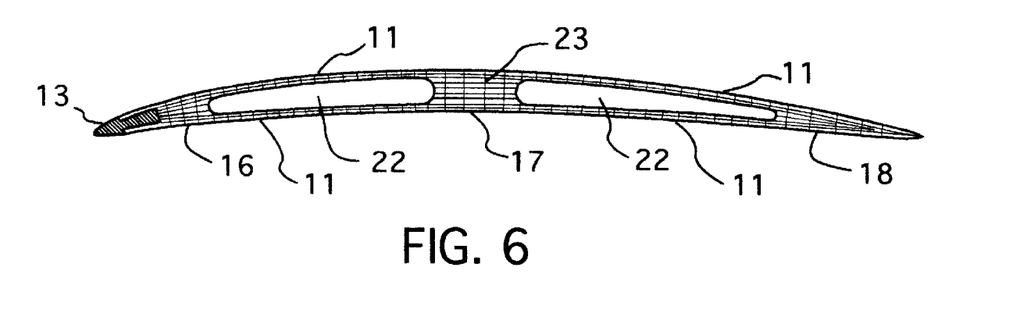
FIG. 6 is a cross-sectional view along lines 6—6 of FIG. 5, showing a typical airfoil section through the hollow core regions.

A typical airfoil cross-sectional view taken through the hollow regions 22 is shown in FIG. 6. Here, individual layers of material fabric are laid upon one another to create three solid spar regions, forward spar 16, mid spar 17, and aft spar 18. The individual layers that are used to create the substructure 12 come from single plies of warp-knit material with cutouts in them corresponding to the location of the hollow regions 22 in the substructure. Each layer of the substructure 12 is dropped off to create a variation in height across the airfoil section as it approaches the leading or trailing edge. A nominal step is achieved at each stack drop-off. The trailing edge runout at the aft spar 18 is a solid stitched stack thickness created as the individual layers of the substructure 12 drop off and until only the layers of the cover 11 are remaining. The cover 11 is terminated at three edges and wraps around the root section in a continuous fashion at the fourth edge to render the outer surface of the blade assembly 10. The hollow regions 22 between the spar and rib elements are maintained as the cutout regions in the individual layers coleus upon one another. The interface between the cover 11 and substructure 12 is stitched with penetration thread 23, as are the cover 11 areas that encompass the hollow regions 22.

Figure 7:
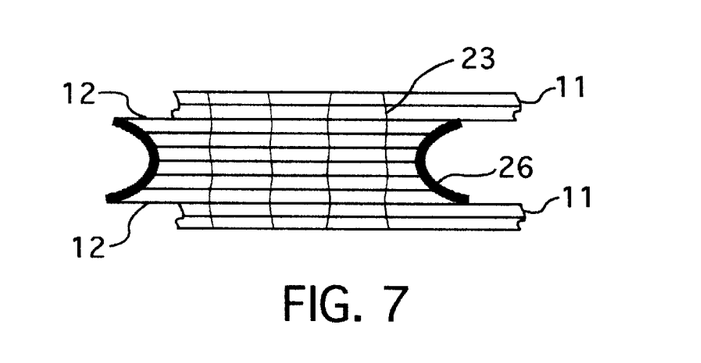
FIG. 7 is a cross-sectional view along lines 7—7 of FIG. 5, showing a typical cover and spar interface.

A cross-sectional view of the mid spar 17 is shown in FIG. 7. The collection of fabric layers that comprise the substructure 12 are built-up to create a solid thickness which is bounded on both surfaces by the cover 11. The individual layers are held together by penetration thread 23 and resin. The spar solid elements run from the root fitting 15 to the tip closeout detail 14. Along the sides, as the spar transitions from a solid to a hollow section, the individual material layers are dropped off side-to-side in a staggered fashion. This is done to create a substructure fillet 26 which is typical around the periphery of the hollow regions. The frayed edges of the trimmed fabric layers will mix with resin to form a gradual transition at this location. This results in a natural radius for the inflatable bladder to form up against. This feature is important because it prevents the bladder from bridging across the drop-off steps and failing during the cure cycle.

Figure 8:
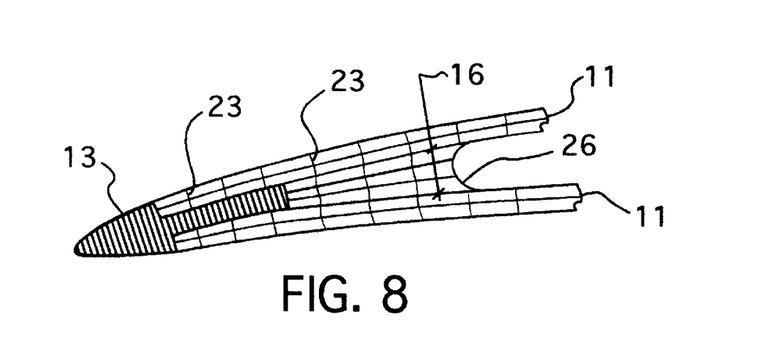
FIG. 8 is a cross-sectional view along lines 8—8 of FIG. 5, showing the leading edge detail and forward spar interface.

The forward edge of the blade assembly 10 is closed out with a titanium leading edge detail 13 that is cocured between the suction and pressure sides of the cover 11 as illustrated in the cross-sectional view of FIG. 8. Here, the edges of the forward spar 16 terminate at the back edge of the leading edge detail 16. Penetration thread 23 stitching for the cover 11 continues to within 0.25 inches of the stack edge. Penetration thread 23 stitching through the cover 11 and substructure 12 continues to within .25 inches of the substructure 12 edges. The stitching in this region is important for improving the out-of-plane strength at the forward spar 16 region for the bird-strike load case. The aft edges of the forward spar 16 stacks are cut in the side-to-side staggered fashion to form the substructure fillet 26 typically found around the hollow regions 22.

Figure 9:
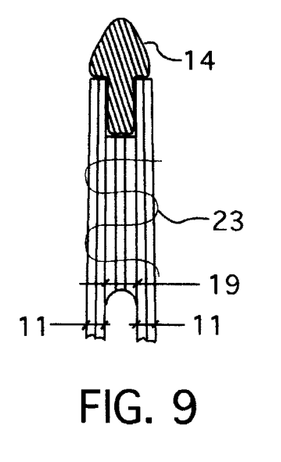
FIG. 9 is a cross-sectional view along lines 9—9 of FIG. 5, showing the tip closeout detail and tip rib interface.

The tip closeout design of the blade assembly 10 is developed in a manner similar to the leading edge closeout. As illustrated in FIG. 9, the tip rib 19 stacks are terminated at the edge of the tip closeout detail 14, while the cover 11 continues slightly farther up until it sandwiches a portion of the titanium tip closeout detail 14. The joint between the carbon fiber materials and the titanium details is a cocured resin interface. The portion of the tip closeout detail 14 that extends beyond the cover 11 is bare titanium. This provides a concentrated mass that can be machined as necessary to balance the rotational inertia of the blade assembly 10. It also provides a rub surface for final sizing of the blade length during operational use.

The transfer of load from the carbon fiber material to the titanium root fitting 15 is a critical element of the blade design. Eventually all of the load carried by the carbon fibers must be transmitted through the root fitting 15. To maximize load transfer, the substructure 12 is trimmed in a staggered fashion and mated to machined steps in the root fitting 15 to create the stepped-lap joint shown in the FIG. 10 cross-sectional view. The cover 11 is not spliced, but continues around the root fitting 15 at each spar location to provide a continuous load path from the pressure to the suction sides of the blade assembly 10. The uninterrupted cover 11 load path significantly improves the joint strength at the root, which is typically a weakness in composite fan blade designs. The interfaces between the carbon fiber materials and titanium details are cocured.

Figure 12:
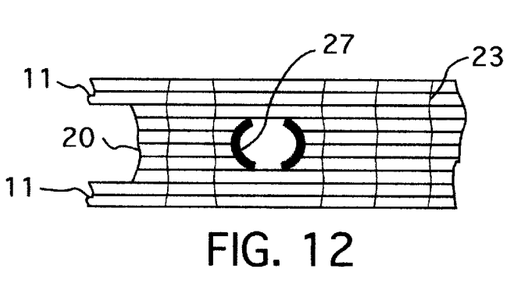
FIG. 12 is a cross-sectional view along lines 12—12 of FIG. 5, showing the access hole through the mid rib.

The relationship between the blade assembly 10 and the fabrication apparatus is important because it dictates many of the design features that are incorporated into the blade design. To accommodate the internal bladder apparatus, a passage way is needed into the hollow regions 22 of the blade assembly 10. Once the cover 11 is stitched to the substructure 12 access can only be gained through an access hole 37 through the root fitting 15 as illustrated in the FIG. 11 cross-sectional view. Each access hole 37 is drilled in the root fitting 15 between the attachment lugs. Access through the root rib 21 is provided by locally trimming slots in the inner most substructure 12 layers; in line with the root fitting 15 access hole 37. Small access holes are also required through the substructure 12 at the mid rib 20 location. A typical rib access hole 27 is illustrated in the FIG. 12 cross-sectional view. The hole is formed by locally trimming slots in the inner most layers of the substructure 12 in a perpendicular direction to the mid rib 20. It is through these access holes that the forming bladder apparatus must be inserted and later removed.

Figure 13:
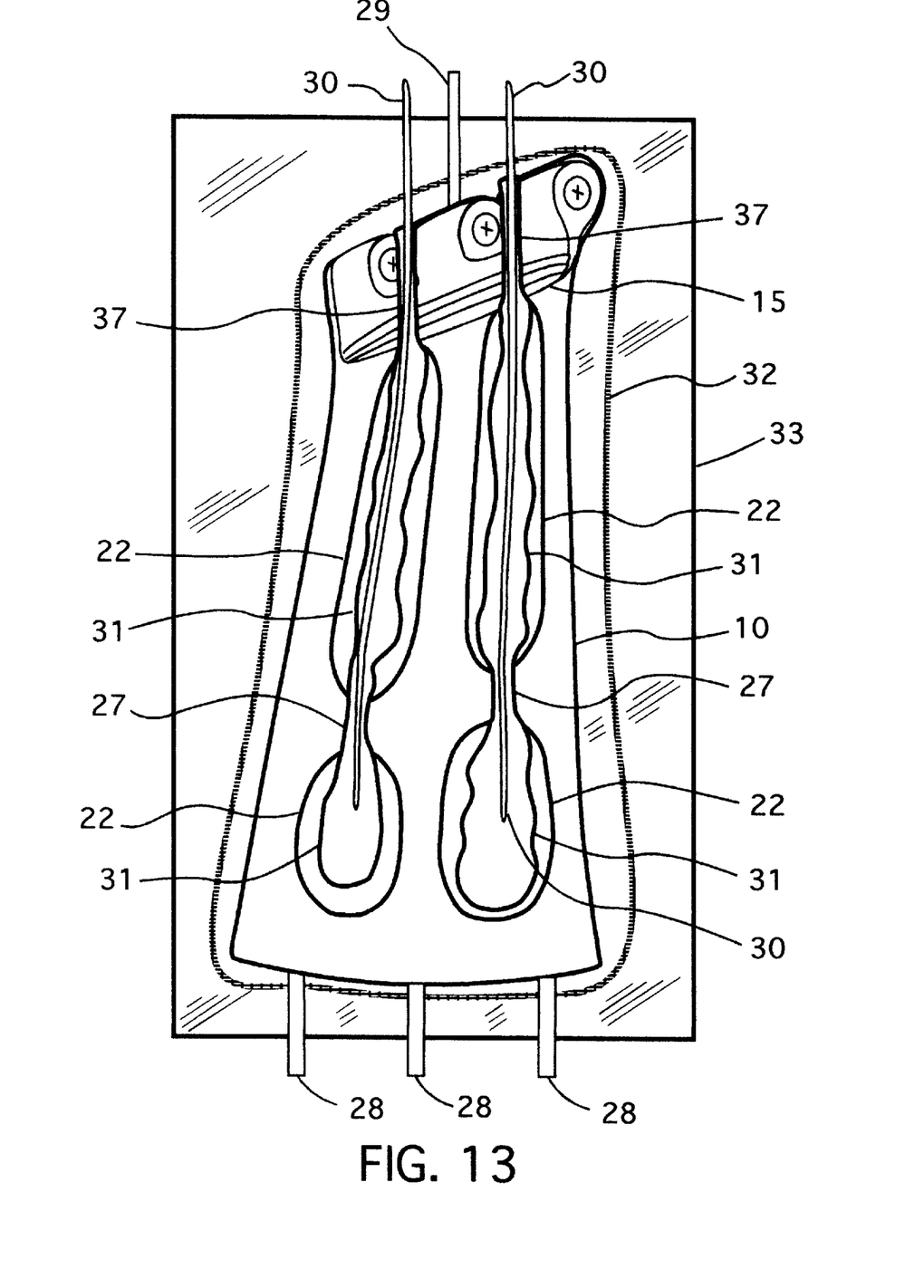
FIG. 13 is a diagrammatic view showing the internal cavities of the blade assembly inside the forming die.
Figure 14:
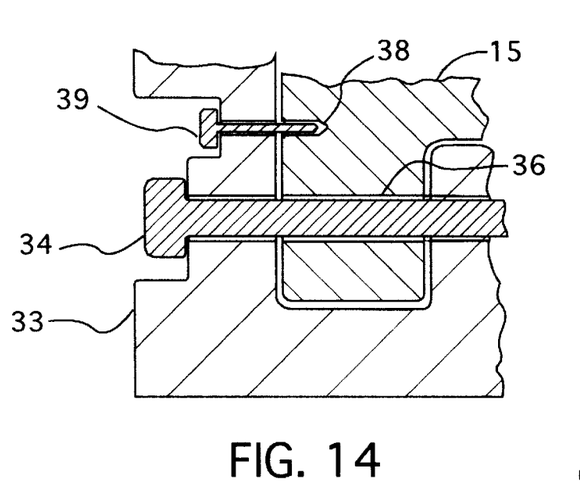
FIG. 14 is a cross-sectional view showing the corner of the root fitting and forming die.

The positional relationship between the blade assembly 10 and the forming apparatus is shown diagrammatically in FIG. 13. The outline and internal cavities of the blade assembly 10 are shown inside an approximate cross-section of the forming die 33. Representative locations for the resin injection ports 28 and the resin exit port 29 are shown. The part is surrounded by a resin seal 32 to prevent leakage during resin infusion. The internal forming apparatus consists of the inflatable bladder 31 and the bladder support tube 30. These elements are shown positioned inside the hollow regions 22 prior to inflation. As the forming die 33 is heated and resin is infused, the inflatable bladder 31 is expanded to fill the hollow regions 22 and to provide the required internal pressure necessary to cure the part. After the blade assembly 10 is cured, the bladder apparatus is removed through the rib and root fitting access holes 27 and 37.

Another important relationship between the forming die 33 and the root fitting 15 is the locating feature used to properly position the root fitting 15 inside the forming die 33 and to prevent resin from entering the root fitting attachment hole 36 during the resin infusion process. While the primary purpose of the root fitting attachment hole 36 is to provide a means of fastening the blade assembly 10 onto the fan rotor hub, it also can be used in conjunction with the locator hole 38 to index the root fitting 15 inside the forming die 33. The FIG. 14 cross-sectional view depicts one corner of the root fitting 15 and forming die 33 interface. For this design feature, the left and right sides of the forming die 33 at the root section would have matching holes drilled to accommodate two large locating pins 34. Then, one side of the forming die 33 would also be drilled to accommodate the small locating pin 39 shown in the figure.

Figure 15:
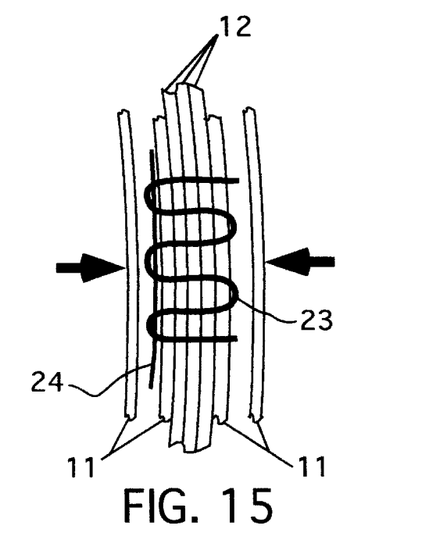
FIG. 15 is a cross-sectional view similar to FIG. 3, showing an alternative embodiment.

Now referring to FIG. 15, which shows an alternative stitching method to the preferred embodiment shown in FIG. 3. Here, the outer most material layer of the cover 11 is not stitched with the penetration thread 23. Although this would reduce the damage resistance capability of the blade assembly 10, it could improve the surface roughness and enhance the aerodynamic performance. All other aspects of the design would be identical to FIGS. 1 through 14.

Figure 16:
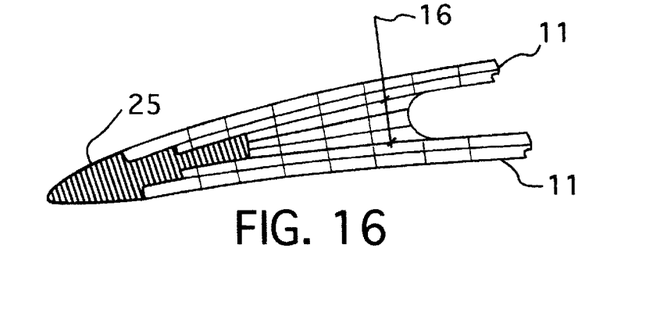
FIG. 16 is a cross-sectional view similar to FIG. 8, showing an alternative embodiment.

Now referring to FIG. 16, which shows an alternative leading edge joint to the preferred embodiment shown in FIG. 8. Here, a stepped-lap joint is used instead of a simple lap joint. This approach could be used to improve the shear load transfer between the leading edge detail 25 and the cover 11. All other aspects of the design would be identical to FIGS. 1 through 14.

Figure 10:
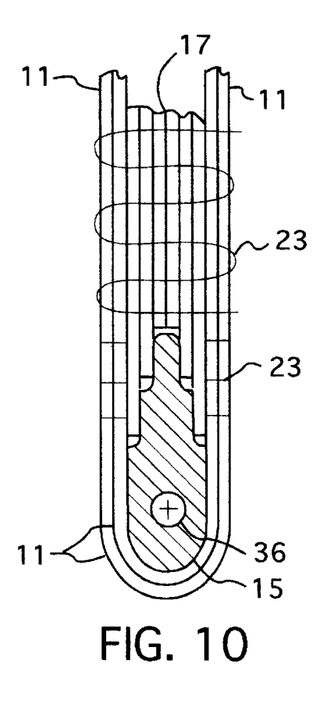
FIG. 10 is a cross-sectional view along lines 10—10 of FIG. 5, showing the cover and spar runout at the root fitting.
Figure 11:
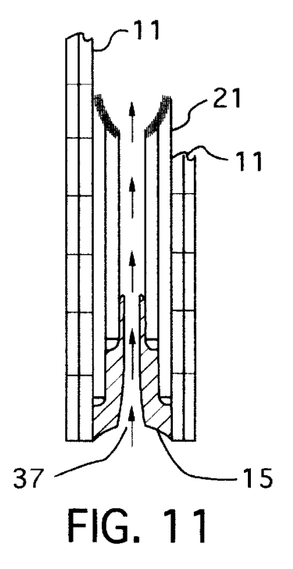
FIG. 11 is a cross-sectional view along lines 11—11 of FIG. 5, showing the access hole through the root fitting and root rib.
Figure 17:
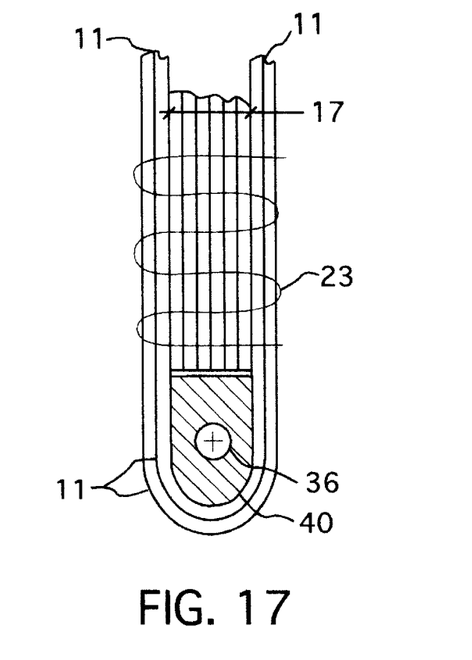
FIG. 17 is a cross-sectional view similar to FIG. 10, showing an alternative embodiment.

Now referring to FIG. 17, which shows an alternative root fitting detail 40 runout design to the preferred embodiment shown in FIG. 10. Here, a simple butt splice is used instead of a stepped-lap joint at the root rib runout. This approach could be used to reduce the fabrication cost of the root fitting. All other aspects of the design would be identical to FIGS. 1 through 14.

Figure 18:
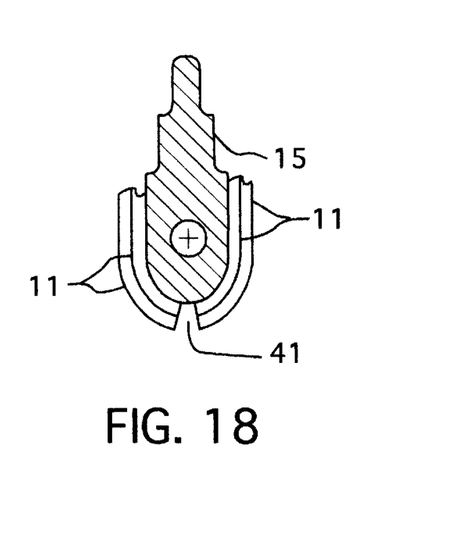
FIG. 18 is a cross-sectional view similar to FIG. 10, showing an alternative embodiment.

Now referring to FIG. 18, which shows an alternative for the cover 11 design to the preferred embodiment shown in FIG. 10. Here, the cover 11 is not continuous at the root fitting 15, but rather split 41 along the centerline of the parting-plane between the pressure and suction sides of the blade. Although this approach would significantly reduce the load capability around the root fitting 15, it could simplify the manufacturing complexity of the cover 11. All other aspects of the design would be identical to FIGS. 1 through 14.

Figure 19:
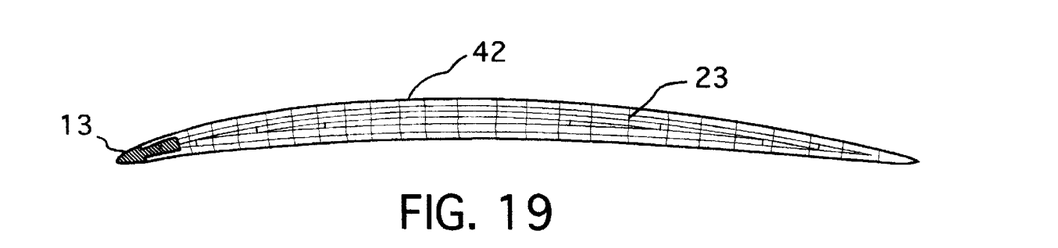
FIG. 19 is a cross-sectional view similar to FIG. 6, showing an alternative embodiment.

Now referring to FIG. 19, which shows an alternative substructure arrangement to the preferred embodiment shown in FIG. 6. Here, the hollow regions 22 are not created in the substructure 12 and the substructure element of the blade assembly is kept solid. Although this would reduce the structural efficiency of the blade assembly 10, it could result in lower manufacturing costs. All other aspects of the design would be identical to FIGS. 1 through 14 except that the hollow regions 22 would not be present. The forming pressure required to cure the part would be provided by applying mechanical pressure to the forming die 33 to squeeze the stack layers together.

Although exemplary embodiments of the invention have been shown and described, many changes, modifications, and substitutions may be made by one having ordinary skill in the art without departing from the spirit and scope of the invention. Therefore, the scope of the invention is to be limited only in accordance with the following claims.

Part Number Listing:
10. Blade Assembly
11. Cover
12. Substructure
13. Leading Edge Detail
14. Tip Closeout Detail
15. Root Fitting
16. Forward Spar
17. Mid Spar
18. Aft Spar
19. Tip Rib
20. Mid Rib
21. Root Rib
22. Hollow Region
23. Stitching
24. Lock Stitch
25. Alternate Leading Edge Design
26. Substructure Fillet
27. Rib Access Hole
28. Resin Port In
29. Resin Port Out
30. Bladder Support Tubes
31. Inflatable Bladder
32. Resin Seal
33. Forming Tool
34. Large Locating Pin
35. Resin Voids
36. Root Fitting Attachment Hole
37. Main Hole Through Root Fitting
38. Locator Hole through Fitting
39. Small Locator Pin
40. Alternate root fitting
41. Split of cover stacks
42. Solid blade configuration

What I claim as my invention is:

1. A stitched composite fan blade comprising:
   a fiber reinforced substructure;
   a fiber reinforced cover, attached to said substructure, having a leading edge region, a tip region, and a root region;
   penetration thread stitched through at least a portion of the thickness of said cover and through the thickness of said substructure;
   and a root fitting attached at said root region.

2. The fan blade as recited in claim 1, further comprising locking thread over which said penetration thread is stitched.

3. The fan blade as recited in claim 1, wherein said substructure is comprised of individual stacks of carbon fiber material.

4. The fan blade as recited in claim 1, wherein said cover is comprised of individual stacks of carbon fiber material.

5. The fan blade as recited in claim 1, wherein the suction and pressure sides of said cover is comprised of at least one stack of carbon fiber material.

6. The fan blade as recited in claim 1, wherein said substructure and said cover are comprised of individual stacks of carbon fiber material.

7. The cover as recited in claim 4, wherein a portion of said individual stacks of carbon fiber material of said cover are continuous around at least a portion of said root fitting.

8. The fan blade as recited in claim 6, wherein said individual stacks of carbon fiber material of said substructure have interior cutouts creating hollow regions enclosed by said cover.

9. The fan blade as recited in claim 8, wherein said penetration thread is stitched through at least a portion of the thickness of said cover in said hollow regions.

10. The fan blade as recited in claim 9 further comprising locking thread over which said penetration thread is stitched.

11. The fan blade as recited in claim 8, further comprising rib and spar structures between hollow regions of said substructure.

12. The fan blade as recited in claim 8, wherein said substructure has at least one passageway located within at least one said rib structure to provide access for internal bladder apparatus insertion and removal.

13. The fan blade as recited in claim 1, further comprising a leading edge detail attached at said leading edge region.

14. The fan blade as recited in claim 1, further comprising a tip closeout detail attached at said tip region.

15. The fan blade as recited in claim 1, further comprising a leading edge detail attached at said leading edge region and a tip closeout detail attached at said tip region.

16. The fan blade as recited in claim 15, wherein said leading edge detail, said tip closeout detail, and said root fitting are fabricated from titanium-alloy materials.

17. The fan blade as recited in claim 1, wherein said root fitting contains at least one passageway to provide access for internal bladder apparatus insertion and removal.

18. The fan blade as recited in claim 14, wherein said tip closeout detail contains at least one passageway to provide access for internal bladder apparatus insertion and removal.

19. The fan blade as recited in claim 1, wherein said root fitting contains at least one locator hole.

* * * * *